(No Model.)
J. H. WICKES.
REFRIGERATOR.
No. 279,062. Patented June 5, 1883.
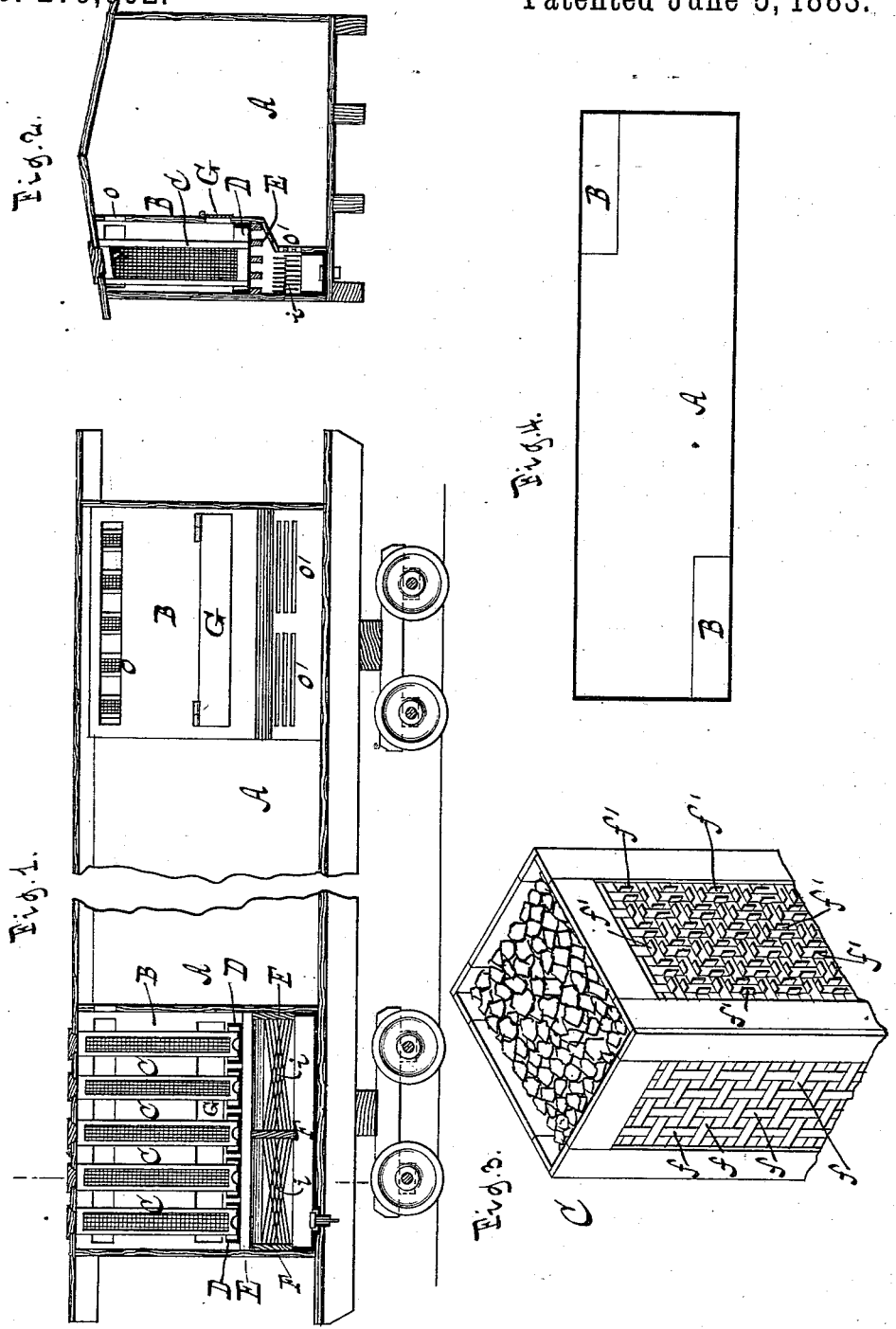
WITNESSES:
INVENTOR
James H. Wickes
BY Van Santvoord & Hauff
his ATTORNEYS

United States Patent Office.

JAMES H. WICKES, OF EAST ROCHESTER, NEW YORK.

REFRIGERATOR.

SPECIFICATION forming part of Letters Patent No. 279,062, dated June 5, 1883.

Application filed April 7, 1883. (No model.)

*To all whom it may concern:*

Be it known that I, JAMES H. WICKES, a citizen of the United States, residing at East Rochester, in the county of Monroe and State of New York, have invented new and useful Improvements in Refrigerators, of which the following is a specification.

This invention relates to the construction and arrangement of parts of the air-cooling chambers of refrigerators or refrigerator-cars, and especially that class thereof which are described in Letters Patent of the United States granted to me July 20, 1880, No. 230,376, and October 4, 1881, No. 247,975.

The novel features of my improvement are hereinafter fully described, and illustrated in the accompanying drawings, in which—

Figure 1 represents a longitudinal vertical section. Fig. 2 is a vertical cross-section. Fig. 3 is a detail view. Fig. 4 is a diagram showing an arrangement of cooling-chambers.

Similar letters indicate corresponding parts.

The letter A designates the provision-chamber of a refrigerator, constituting in this example the body of a car. At each end of this provision-chamber, and on opposite sides thereof, is located a cooling-chamber, B, which communicates with the provision-chamber by openings $o$ $o'$, near the top and bottom, so that the air may enter and leave the cooling-chamber at those points.

In each of the cooling-chambers B is located a series of tanks, C, which are open at the bottom and rest in pans D, which are composed of sheet-iron, galvanized, or other metal, and are larger in length and width than the tank, so that a free space is left around the tanks in the pans.

In practice the tanks C are supplied with broken ice, to which may be added a suitable quantity of salt to form a freezing-mixture, and as the ice melts the water escapes from the tanks to the pans D, whence it overflows, and by the portion of water always remaining in the pans the ice is kept in a melting condition at the base of the tanks, so that a free and continuous overflow is maintained.

It will be observed that by distributing the ice through a series of tanks a very large cooling-surface is obtained, while the pans, together with the exposed water therein, also materially increase such surface.

The escape of water from the tanks C is through the open bottoms thereof, and hence is uniform in all directions, also through orifices formed in one or more sides of the tanks, at or near the bottom; but when the tanks are left open at the bottom these orifices may be omitted.

The pans D are supported by slats E, resting on girders F, and to these girders are hung a series of wires, $i$, intersecting each other to form a grating, so that the water overflowing from the pans is caught on this grating and thereby distributed, so as to increase its cooling effect. From the wire grating $i$ the water is received in a drip-pan, G, whence it escapes it the usual manner.

The sides of each of the tanks C are composed of strips $f$, of galvanized iron or other metal, which are woven together, leaving interstices for the air and some of the drip-water to pass through, so that the outer surfaces of the tanks are always kept moist, and when the water is salt this moisture tends to prevent the formation of too thick a coating of frost on the tanks. The sides of the tanks are also provided with surface projections $f'$, to increase the effective area of the tanks, such projections consisting of metallic strips, of substantially U shape, the ends of which are passed outward through the said interstices of the tanks, as indicated in Fig. 3, so that no extraneous fastening is required to hold said strips in place. The U-shaped strips, however, can also be combined with a tank having plain sides, in which case they are soldered, or fastened in any other similar manner.

In the inner side of each cooling-chamber B is a door, G, which may be hinged or otherwise arranged, and is immediately above the pans D, so that convenient access may be had thereby to the pans for cleaning or other purposes.

It should be remarked that when the ice-tanks C are composed of the woven metallic strips, with or without the surface projections, the overflow-pans D may be omitted.

What I claim as new, and desire to secure by Letters Patent, is—

1. The combination, substantially as hereinbefore described, with the cooling-chamber, of the overflow-pans and the open-bottomed ice-tanks resting in the pans.

2. The combination, substantially as hereinbefore set forth, with the cooling-chamber, of the overflow-pans, the open-bottomed ice-tanks resting in the pans, the slats supporting the pans, and the wire grating below the slats.

3. The combination, substantially as hereinbefore set forth, with the cooling-chamber, of the overflow-pans and the ice-tanks, the latter resting in the pans, and each having its sides composed of woven metallic strips.

4. The combination, substantially as hereinbefore set forth, with the cooling-chamber, of the overflow-pans and the ice-tanks, the latter resting in the pans, and each having its sides composed of woven metallic strips, and provided with surface projections consisting of U-shaped metallic strips, the ends of which are passed outward through the interstices of the woven strips.

5. The combination, substantially as hereinbefore set forth, with the cooling-chamber, of the overflow-pans and the ice-tanks, the latter resting in the pans, and having surface projections formed by attached U-shaped strips.

6. The combination, substantially as hereinbefore set forth, of the overflow-pans and ice-tanks with a cooling-chamber, having one side provided with a door next above the pans.

7. The combination, substantially as hereinbefore described, with the cooling-chamber, of an ice-tank having its sides composed of woven metallic strips, and provided with surface projections consisting of U-shaped metallic strips, the ends of which are passed outward through the interstices of the woven strips.

In testimony whereof I have hereunto set my hand and seal in the presence of two subscribing witnesses.

JAMES H. WICKES. [L. S.]

Witnesses:
ALBERT H. HARRIS,
JOHN A. BARHITE.